United States Patent
Ueyoko

(10) Patent No.: US 7,100,655 B2
(45) Date of Patent: *Sep. 5, 2006

(54) AIRCRAFT TIRE WITH IMPROVED BEAD STRUCTURE

(75) Inventor: Kiyoshi Ueyoko, Fairlawn, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 41 days.

This patent is subject to a terminal disclaimer.

(21) Appl. No.: 10/637,477

(22) Filed: Aug. 8, 2003

(65) Prior Publication Data

US 2004/0025999 A1 Feb. 12, 2004

Related U.S. Application Data

(62) Division of application No. 09/944,819, filed on Aug. 31, 2001, now Pat. No. 6,648,041.

(51) Int. Cl.
*B60C 15/00* (2006.01)
*B60C 15/06* (2006.01)

(52) U.S. Cl. ............ 152/539; 152/542; 152/546; 152/547; 152/552; 152/553

(58) Field of Classification Search ........ 152/539, 152/541, 542, 547
See application file for complete search history.

(56) References Cited

U.S. PATENT DOCUMENTS

| | | | |
|---|---|---|---|
| 3,245,454 A | 4/1966 | Lewis | 152/354 |
| 3,638,705 A | 2/1972 | Devienne et al. | 152/356 |
| 3,722,567 A | 3/1973 | Delobelle | 152/354 |
| 4,244,414 A | 1/1981 | Uemura et al. | 152/354 R |
| 4,871,004 A * | 10/1989 | Brown et al. | 152/209.4 |
| 5,080,942 A * | 1/1992 | Yau | 428/34.9 |
| 5,160,384 A | 11/1992 | Ueyoko et al. | 152/454 |
| 5,215,445 A | 6/1993 | Chen | 417/313 |
| 5,285,835 A | 2/1994 | Ueyoko et al. | 152/209 R |
| 5,379,820 A | 1/1995 | Cesar et al. | 152/546 |
| 5,476,129 A * | 12/1995 | Shoyama | 152/454 |
| 5,479,977 A | 1/1996 | Tamano et al. | 152/542 |
| 5,522,443 A * | 6/1996 | Ueyoko et al. | 152/542 |
| 5,614,580 A * | 3/1997 | Zanzig et al. | 524/492 |
| 5,769,982 A | 6/1998 | De Loze de Plaisanc | 152/546 |
| 6,525,133 B1 * | 2/2003 | Wideman et al. | 524/848 |

FOREIGN PATENT DOCUMENTS

| | | |
|---|---|---|
| EP | 0867312 | 9/1998 |
| EP | 0958946 | 11/1999 |
| JP | 07017220 A | 1/1995 |

(Continued)

*Primary Examiner*—Justin Fischer
(74) *Attorney, Agent, or Firm*—June E. Rickey; David L. King

(57) ABSTRACT

A pneumatic radial ply tire 100 for use on aircraft has a radial reinforced carcass 20 having at least one axially inner ply 2A, 2B, 2C and 2D of textile cords 21 wound around a pair of bead cores 33. The improved bead structure 30 has a flipper 50 having an axially inner leg $L_I$ and axially outer leg $L_E$. The ends $L_I$, $L_E$ of the flippers 50 are above the bead core height $B_h$ and below the apex A of an elastomeric strip 40 satisfying the relation $B_h<L_E<0.7D$ and $B_h<L_I<0.7D$. Additionally, the tire carcass 20 has at least one axially outer ply 2E, 2F of textile cords 21 extending from bead 30 to bead 30 along the turn-ups 20A, 20B, 20C and 20D of the axially inner plies 2A, 2B, 2C and 2D. The plies 21 are closely spaced along the natural ply path.

1 Claim, 8 Drawing Sheets

FOREIGN PATENT DOCUMENTS

WO WO 99/04989 * 2/1999
WO 0032424 8/2000

* cited by examiner

AIRCRAFT TIRE WITH IMPROVED BEAD STRUCTURE

This is a Divisional of application Ser. No. 09/944,819, filed Aug. 31, 2001, now U.S. Pat. No. 6,648,041.

TECHNICAL FIELD

The present invention relates to a tire with radial carcass reinforcement intended to support heavy loads and inflated to relatively high pressures for high speed use, in particular an airplane tire.

BACKGROUND OF THE INVENTION

The radial carcass reinforcements of such tires generally comprise several plies of textile cords, which are anchored in each bead to at least one bead wire and generally have a single bead wire. The reinforcing elements of these reinforcements are wound around said bead wire from the inside to the outside, forming turn-ups, the respective ends of which are spaced radially from the axis of rotation of the tire. The severe conditions under which airplane tires are used are such that the life of the beads is short, particularly in the area of the turn-ups of the carcass reinforcement.

A substantial improvement in performance is obtained by the separating of the plies of the carcass reinforcement into two groups. The first group comprises the plies of the carcass reinforcement which are axially towards the inside in the region of the beads, these plies being then wound around a bead wire in each bead from the inside to the outside of the tire. The second group is formed of at least one axially outer ply in the region of the beads, which ply is generally wound around the bead wire from the outside to the inside of the tire. Such arrangements are known; for instance, in U.S. Pat. No. 4,244,414.

The life of beads formed in this manner can be improved by the presence in each bead of an additional reinforcement ply, wound around the bead wire and thus forming an axially outer leg and an axially inner leg, said reinforcement ply, also known as an inner flipper, being the ply closest to the rubber filler, radially above the anchoring bead wire. A tire structure of this type is shown in U.S. Pat. No. 5,285,835. In U.S. Pat. No. 5,769,982, the life of the beads of airplane tires can be further improved, particularly when they are subjected to heavy overloads which can result in a crushing of the order of 50% and more of their height, by having the arrangement of the ends of the turned-up portions or turn-ups of the inner carcass plies and the ends of the legs of the inner flipper with respect to the radial position of the radially upper end of the rubber filler located above the anchoring bead wire and the filler.

In accordance with that invention, an airplane tire, inflated to a high pressure, having a tread, a crown reinforcement, and a radial carcass reinforcement comprising at least two axially inner plies of textile cords wound around a bead wire in each bead from the inside to the outside forming turn-ups and at least one axially outer ply of textile cords superimposed on the inner plies below the crown reinforcement and along the turn-ups in said beads, said bead wire being radially surmounted by a filler of vulcanized rubber mix, having the shape substantially of a triangle, the apex of which radially furthest from the axis of rotation is at a distance D from a straight line parallel to said axis, passing through the geometrical center of the circle circumscribed on the cross-section of the anchoring bead wire, known as the reference line, and also comprising at least one inner flipper wound around the bead wire to form an axially inner leg and an axially outer leg which are axially adjacent to the filler above the bead wire, characterized by the fact that the end of the axially outer leg of the inner flipper is located at a radial distance $L_E$ from the reference line such that $L_E$ is between 0.40 D and 0.80 D; the end of the turn-up of the inner carcass ply arranged axially furthest to the inside is located at a distance $H_A$ from the reference line such that $H_A$ is between 0.15 D and 0.50 D, and by the fact that the ends respectively of the inner leg of the inner flipper and of the turn-ups of the inner carcass ply or plies which are axially furthest to the outside.

While this construction is durable, it limits the number of carcass plies that can be provided in the bead area and the extended length of the flipper means that the outer plies being turned down around the bead and the inner plies are spaced from the natural ply path of the tire in the region of the flipper. This spacing, while believed desirable, results in one less ply being available in the structure and in the case of very large aircraft the tire structure ideally may require the use of another ply which is effectively precluded by the use of the extend length flipper.

It is an object of the present invention to provide a lightweight efficient tire structure having superb durability.

It is a further object of the present invention to provide an improved bead structure wherein the use of inside turn-up plies and outside turndown plies is optimized by the placing of the plies close to the natural ply path.

SUMMARY OF THE INVENTION

A pneumatic tire for use on aircraft has a nominal bead diameter $N_{BD}$, a crown reinforcement, and a radial carcass reinforcement having at least two axially inner plies of textile cord wound around a pair of bead cores, the bead cores having a maximum radial height $B_h$. Each inside ply is wound around the bead from inside to outside forming outside turn-ups. At least one axially outer ply of textile cords extends from bead to bead along the turn-ups of the inner plies. Each bead has an elastomeric filler of substantially triangular shape, the apex of the filler is located above the bead core extending to an apex A as measured from a line YY' parallel to the axis of the tire and passing through the location of the nominal bead diameter or as measured from a reference line XX' parallel to the axis of rotation and passing through the geometric center of the bead core.

The tire has a flipper wound around the bead core to form an axially inner leg and an axially outer leg, the axially inner leg is located at a radial distance $L_i$ from the reference line YY' or XX' and the axially outer leg is located a radial distance $L_e$ from the reference line YY' or XX'. The flipper is oriented where $B_h < L_E < 0.7D$ and $B_h < L_f < 0.7D$ and at least one axially inner ply has turn-ups when the tire has two or more axially inner plies, at least one turn-up is radially above the apex location A and at least one turn-up is below the location A.

The ends of the axially outer leg of the flipper and the ends of the turn-ups of the inner plies are radially staggered.

DEFINITIONS

"Apex" means a non-reinforced elastomer positioned radially above a bead core.

"Aspect ratio" of the tire means the ratio of its section height (SH) to its section width (SW) multiplied by 100% for expression as percentage.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt or breaker reinforcing structure" means at least two layers of plies of parallel cords, woven or unwoven, underlying the tread, unanchored to the bead, and having both left and right cord angles in the range from 17° to 33° with respect to the equatorial plane of the tire.

"Bias ply tire" means a tire having a carcass with reinforcing cords in the carcass ply extending diagonally across the tire from bead core to bead core at about a 25°–50° angle with respect to the equatorial plane of the tire. Cords run at opposite angles in alternate layers.

"Carcass" means the tire structure apart form the belt structure, tread, under tread, and sidewall rubber over the plies, but including the beads.

"Circumferential" means lines or direction extending along the perimeter of the surface of the annular tread perpendicular to the axial direction.

"Chafers" refers to narrow strips of material placed around the outside of the bead to protect cord plies from the rim, distribute flexing above the rim, and to seal the tire.

"Chippers" means a reinforcement structure located in the bead portion of the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core.

"Footprint" means the contact patch are area of the tire tread with a flat surface at zero speed and under normal load and pressure.

"Innerliner" means the layer or layers of elastomer or other material that form the inside surface of a tubeless tire and that contain the inflating fluid within the tire.

"Net-to-gross ratio" means the ratio of the tire tread rubber that makes contact with the road surface while in the footprint, divided by the area of the tread in the footprint including non-contacting portions such as grooves.

"Normal inflation pressure" refers to the specific design inflation pressure and load assigned by the appropriate standards organization for the service condition for the tire.

"Ply" means a continuous layer of rubber-coated parallel cords.

"Radial" and "radially" means directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section height (SH)" means the radial distance from the nominal rim diameter of the tire at its equatorial plane.

BRIEF DESCRIPTION OF THE DRAWINGS

The invention will be described by way of example and with reference to the accompanying drawings in which.

DETAILED DESCRIPTION OF THE INVENTION

Figure 1:
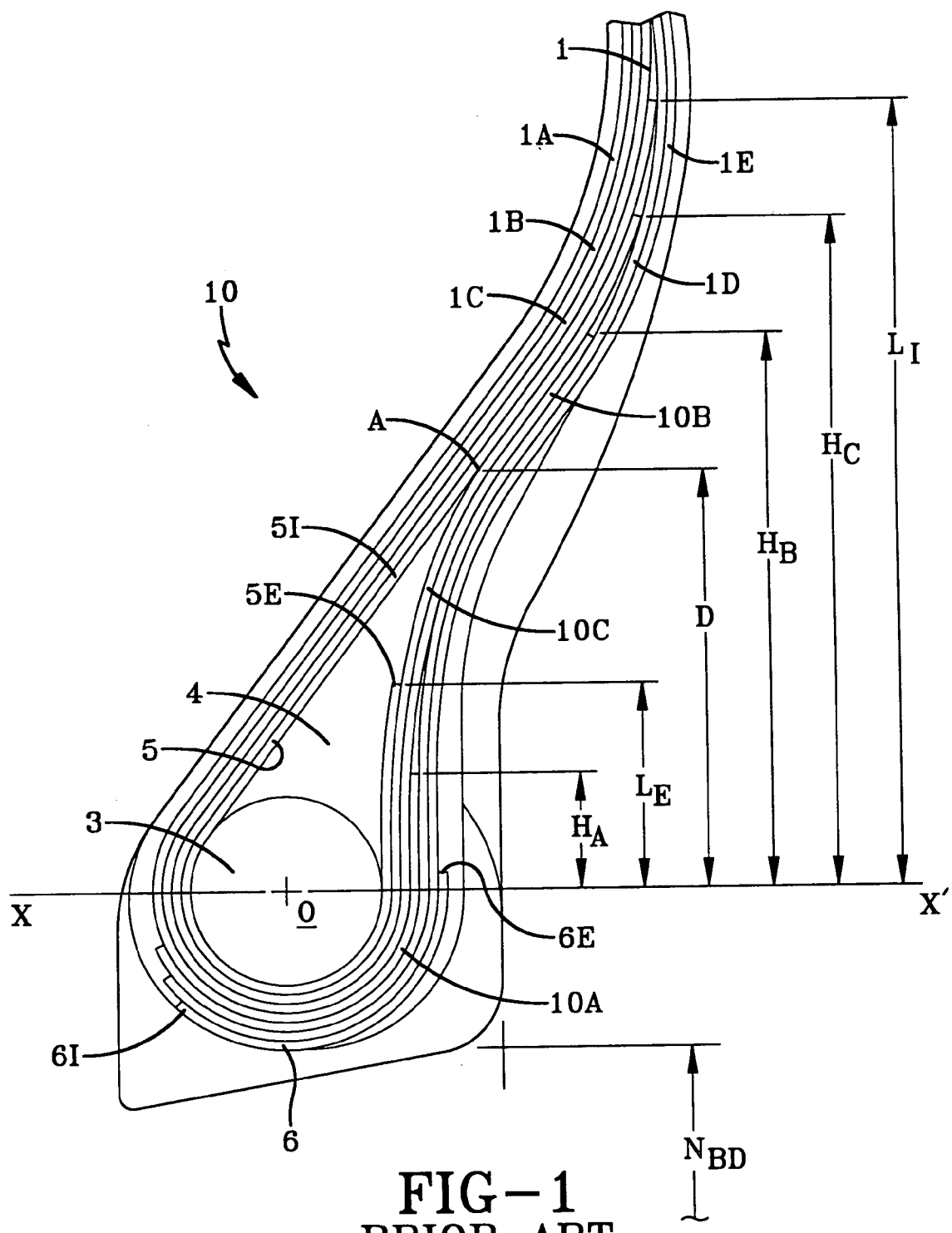
FIG. 1 is a partial cross-sectional view of the prior art tire bead as described in U.S. Pat. No. 5,769,982.

With reference to FIG. 1, diagrammatic view in cross section of a prior art tire bead in accordance to U.S. Pat. No. 5,769,982 is shown.

The example described is that of a prior art tire 10 of standard size 36×11.0 R 18 (standards of the Tire and Rim Association). The carcass reinforcement 1 is formed of five plies 1A to 1E of radial textile cords. Radial cords, as the term is used herein, are cords which form with the circumferential direction of the tire angles which may be within the range of 90°+/−10°. Among these five plies, three axially inner plies 1A, 1B, 1C are wound in each bead 2 around a bead wire 3 shown in the drawing as having a circular cross section, extending from the inside to the outside of the tire P in order to form turn-ups 10A, 10B, 10C.

The cross section of the bead wire 3 is surmounted radially towards the outside by a strip or filler 4 of elastomeric mix having substantially the shape of a triangle, the apex A of which, radially furthest from the axis of rotation of the tire, is located at a distance D from a reference line XX'. The reference line is parallel to the axis of rotation and through the geometrical center O of the circle circumscribed on the cross section of the bead wire 3, which circle, in the case described, is identical with the cross section itself.

The turn-up 10A of the inner carcass ply 1A axially furthest towards the inside has its end spaced radially form the line XX' by the amount $H_A$, which is equal, in the case studied, to 12 mm, namely 0.33 times the distance D, D being equal to 36 mm. As to the ends of the inner plies 10B and 10C, respectively, they are located radially above the apex A of the filler 4 at distances $H_B$ and $H_C$ of 55 mm and 68 mm, respectively.

The same is true of the radial end of the axially inner leg of a flipper 5, which can be formed of radial textile cords identical to the carcass ply cords (but which may also be different), which end is located at a radial distance $L_I$ of 80 mm from the line XX', a distance greater than the distances $H_B$ and $H_C$ referred to above, the three ends thus arranged radially above the apex A being staggered between said apex and the point of the sidewall where the tire has a maximum axial width. As to the radial end of the axially outer leg 5E of the inner flipper 5, it is spaced from the line XX' by the radial distance $L_e$ equal to 0.58 D and greater than the distance $H_A$.

The two carcass plies 1D and 1E, herein called outer plies, cover the turn-ups 10A, 10B, 10C of the inner carcass plies 1A to 1C axially on the outside. The plies 1D and 1E are wound around the bead wire 3 over a portion or circular arc corresponding to an angle at the center of the circle circumscribed on the bead wire 3 equal to at most 180°, so that the ends of these plies 1D and 1E are situated radially below the reference line XX'.

The tire bead 2 is supplemented by a reinforcement ply 6 or outer chafer of radial textile cords, said ply permitting a better distribution of the pressures between the tire and its service rim, as well as assuring protection of the carcass plies against injury upon mounting.

The axially outer end 6E of said chafer is slightly above (about 2 mm) the reference line XX', while its axially inner end 6I is below said line.

This prior art structure has been tested on a dynamometric flywheel under punishing conditions for beads of this type, these conditions corresponding to a simulation of travel on a runway (10160 kg, 4572 m, 46 km/hr), followed by a take-off from 0 to 300 km/hr, the pressure conditions being such that the crushing of the tire under the load of 10160 kg is 50%+/−2% of its height.

Comparison with another prior art tire of the same size comprising the same number of carcass plies and inner and outer flipper and chafer, the inner carcass ply furthest to the inside having a turn-up end of which is located above the apex A, and the outer leg of the inner flipper having its end below said apex, clearly and unexpectedly shows the improvement, in the life of the beads, since the tires of the invention, under the above conditions, have completed on the average 35% more runway-take-off cycles.

Figure 2:
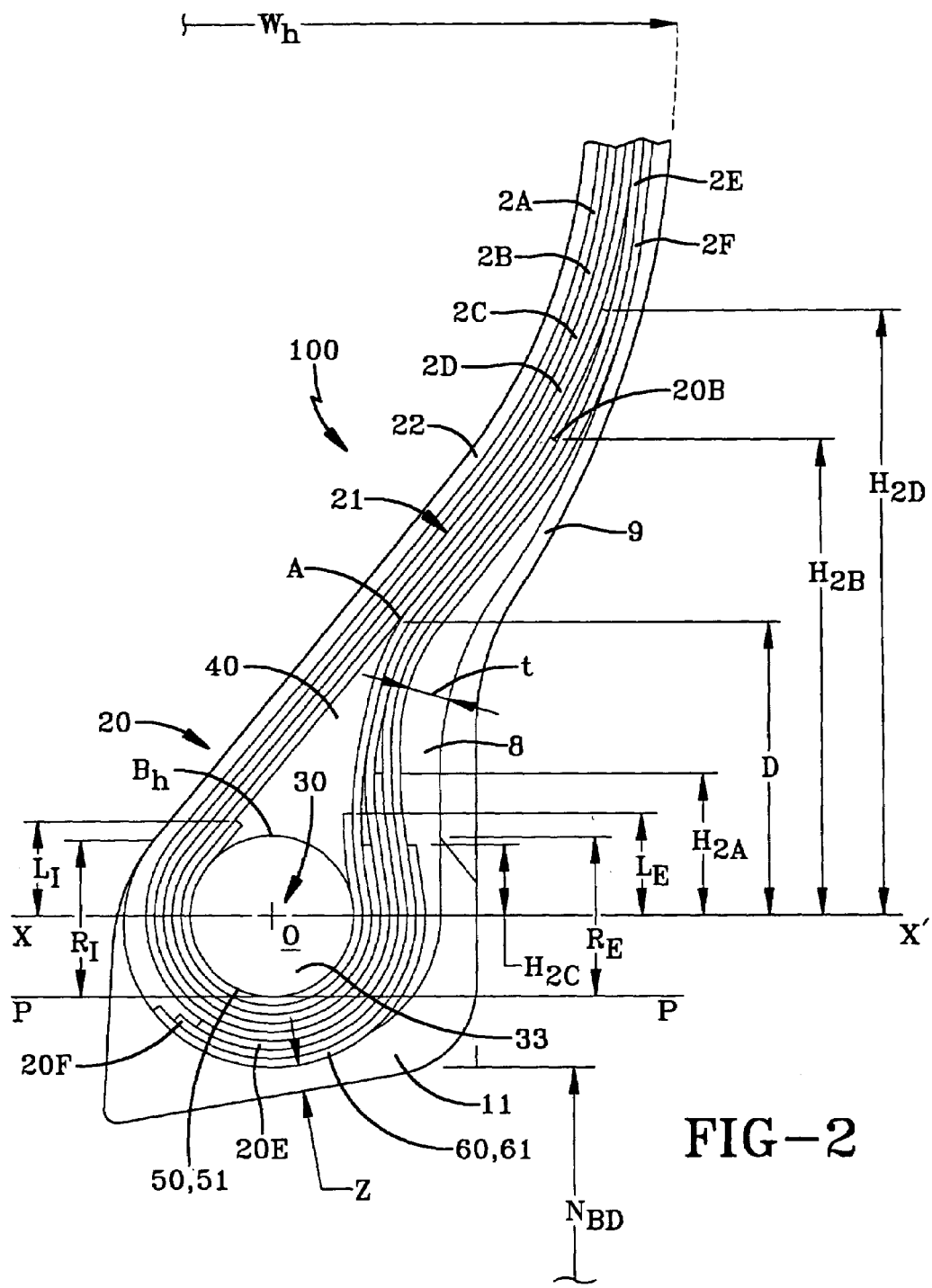
FIGS. 2 and 3 are a partial cross-sectional views of the bead portion of the tire made according to the present invention.
Figure 3:
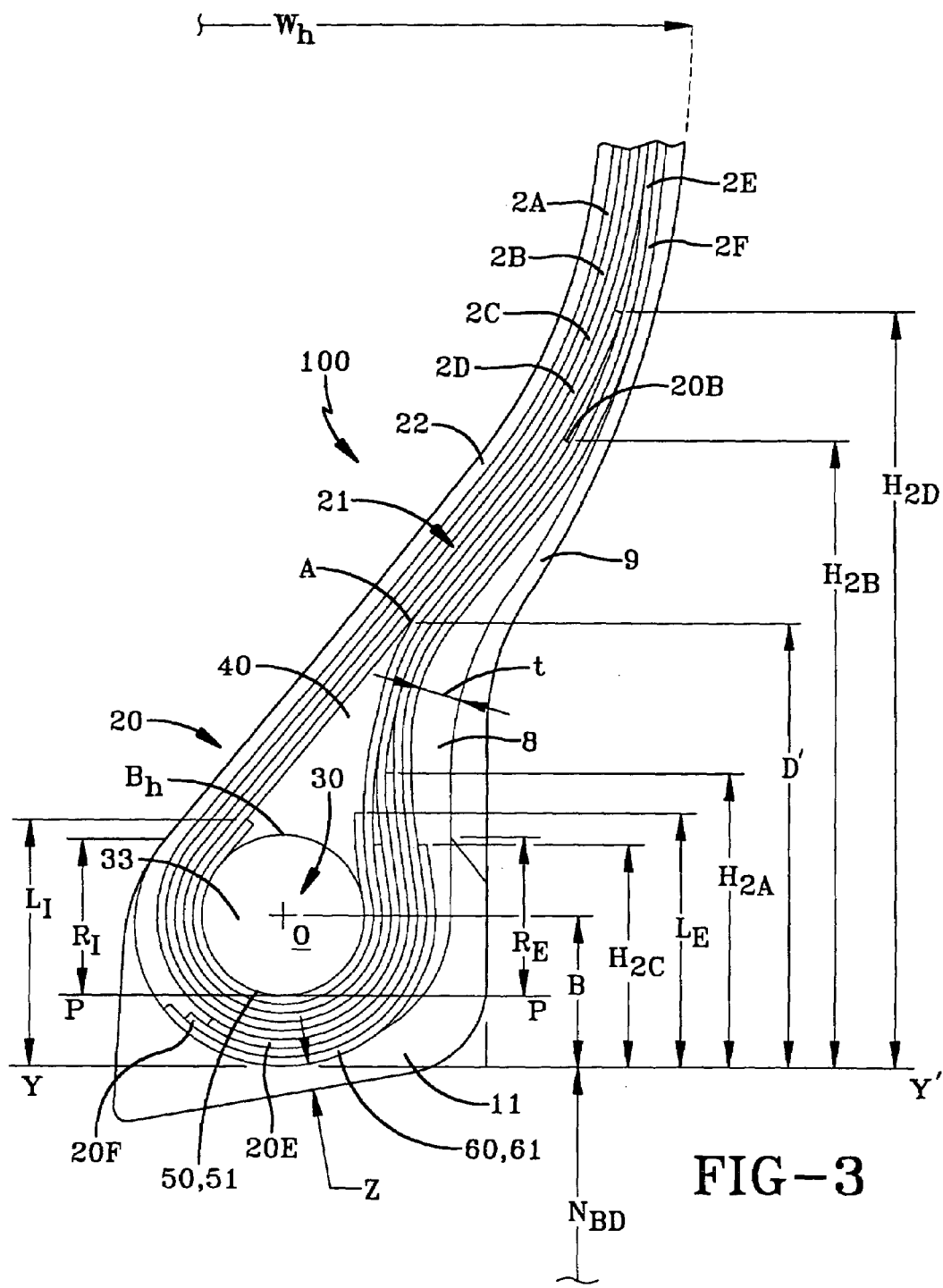
Figure 4:
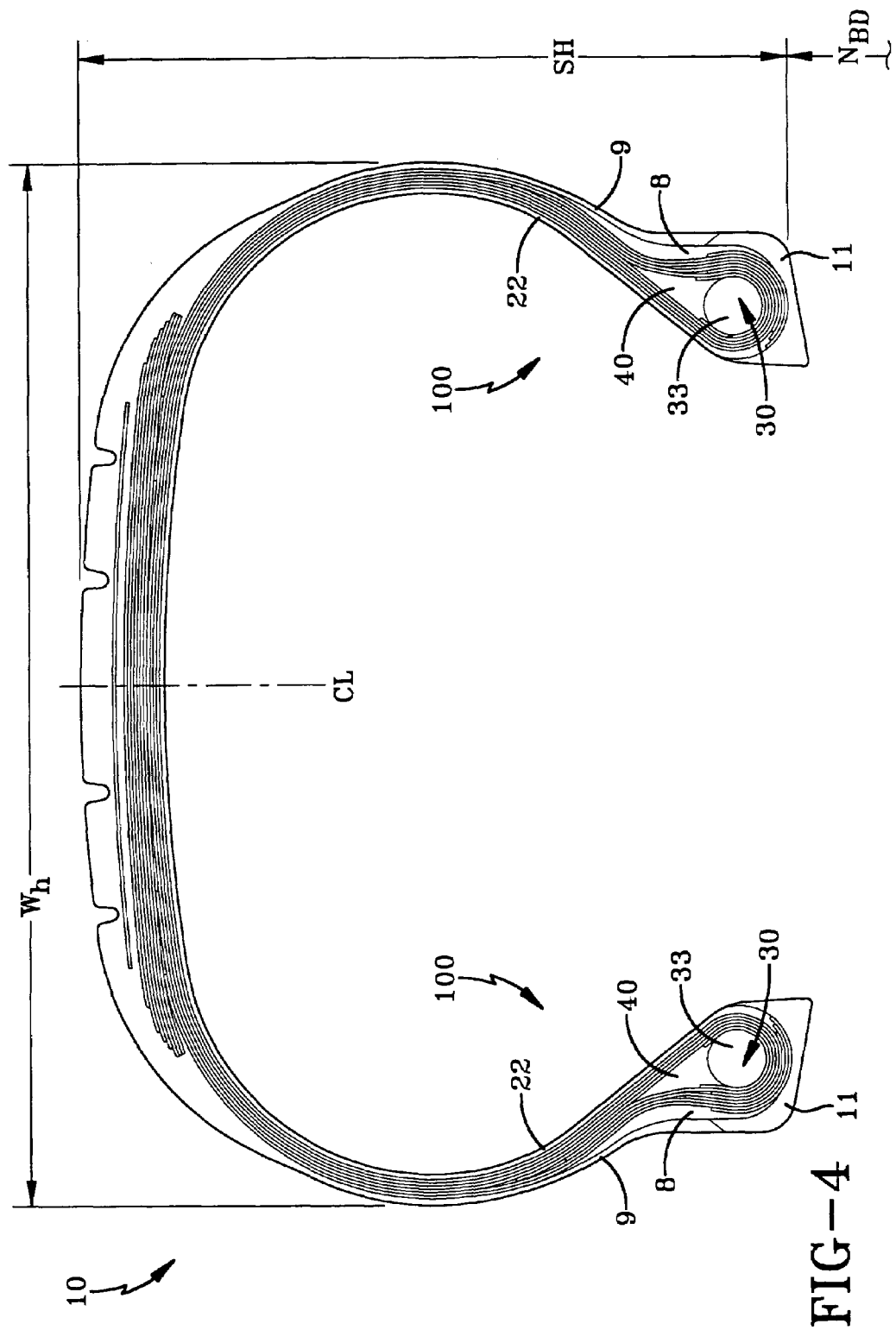
FIG. 4 is a cross-sectional view of the tire.

In contrast, the tire 100 of the present invention is illustrated in a diagrammatic view in cross-section FIGS. 2 and 3.

The example shown is that of a tire of standard size 50×20.0R22 (standard of the Tire and Rim Association).

With reference to FIGS. 2 and 3, the carcass reinforcement 20 is formed of six plies 2A to 2F of radial textile cords 21. The ply cords 21 can be nylon, rayon, or Kevlar™, or steel. Among these six plies, four axially inner plies 2A, 2B, 2C and 2D are wound in each bead around a bead core 33 shown in the drawing having circular cross section. These four plies extend from the inside to the outside of the tire in order to form turn-ups 20A, 20B, 20C and 20D. The carcass reinforcement is radially outward of the innerliner 22 of tire 100.

Outward of the bead core 33 is a strip or filler 40 of elastomeric material commonly referred to as an apex 40 having a substantially triangular shape extending to an apex location A radially furthest from the axis and located a distance D from a reference line XX'. As was shown in FIG. 1 the reference line is also parallel to the axis of rotation and through the geometric center O, of the circle circumscribed on the cross section of the bead core 33.

The turn-up 20A of the inner carcass ply 2A axially furthest toward the inside has its end spaced radially from line XX' by the amount $H_{2A}$ which is, for this exemplary tire size, equal to 29 mm or 0.6 times the distance D, D being equal 48 mm.

As shown, the tire of FIG. 3 has a nominal bead diameter $N_{BD}$ of 22.00 inches (558.8 mm). The line YY' passing through the location of the nominal bead diameter and parallel to the tires axis of rotation wherein the inner most ply 2A has the turn-up 20A at end $H_{2A}$ located 2.0 inches (51 mm) above the line YY' as illustrated in FIG. 3. For comparative purposes with the prior art tire of FIG. 1, FIG. 2 shows all the relationship relative to the reference line XX'. In FIG. 3 all these components are shown relative to the reference line YY'. This reference line is parallel to and passed through the nominal bead diameter $N_{BD}$.

As to the turn-up ends 20B, 20C and 20D of the inner plies 2B, 2C and 2D respectively they are located at a distance $H_{2B}$, $H_{2C}$ and $H_{2D}$ of 85.5 mm, 17.1 mm and 106 mm above the line XX' respectively, or as measured from line YY' in FIG. 3, $H_{2A}$, $H_{2B}$, $H_{2C}$ and $H_{2D}$ are located 50.8 mm, 106.5 mm, 38.1 mm, and 127 mm, respectively. This construction insures the ends are all staggered having pairs of ends 20B and 20D well above the apex A location and pairs of ends 20A and 20C well below the apex A, each pair set 20A, 20C or 20B, 20D is preferably spaced at least 2.0 inches (50.8 mm) apart. The lowest pair of ends is located very close to the bead and is interposed between the bead and the rim flange vertical surface.

As opposed to the prior art tire having three plies 1A, 1B and 1C wherein the ends location satisfies a relationship where 10A<10C<10B the present invention has the ends location satisfy the relationship where 20C<20A<20B<20D. As shown this creates an opportunity to have a very efficient bead structure. The plies 2A through 2D provide a unique combination of ply ends 20A, 20C wherein 0.5 $B_h$<20C<20A<0.7D. As shown the next ply of the wrapping inner plies is a high ply 2B or 2D. The ply ends 20B and 20D satisfy the relationship where A (apex)<20B or 20D>the radial location of the maximum section width $W_h$, when measured from the nominal bead diameter. $W_h$ is the maximum section width of the tire 100.

A flipper 50, which can be formed of radial textile cords 51 similar to those of plies, is located with an inner end $L_I$ slightly above the height $B_h$ of the bead core 33 and an outer end $L_E$ is also shown slightly above the bead core 33 as measured from line YY'. The ends $L_I$, $L_E$ satisfy a relationship wherein $B_h$<$L_I$ and $L_E$<0.7D as measured from the nominal bead diameter $N_{BD}$. To minimize the space occupied by the flipper 50 the cords 51 can be made of a diameter smaller than the ply cords 21.

The carcass further has two carcass plies 2E and 2F herein called outer plies. These outer plies cover the turn-ups 20A through 20D of the inner plies 2A through 2D. The plies 2E and 2F are wound around the bead core 33 over a portion of the circular arc at least past the center of bead core 33 on the radially inner portion. The ply ends 20E and 20F are thus axially inward of the lowest portion of the bead core 33. The ends 20E and 20F are these effectively pinched between the bead core 33 and the rim seat helping to securely anchor these outer plies 2E and 2F.

The tire bead may have an outer chipper 60 of textile cords 61 as shown wrapped around the ends 20E and 20F assuring protection of the carcass plies against injury during mounting. Preferably radially below the chipper 60 is a chafer 11 having a rubber gauge 11 in the range of 0.04 inches (1.0 mm) to about 0.16 inches (4.1 mm).

Axially outward of the chafer and the plies 20E and 20F is an elongated strip 8 of elastomeric material extending from radially inward of the bead adjacent the chafer to a radial location at or slightly above the turn-up 20B but below the turn-up 20D. As shown, this strip 8 is interposed between the sidewall rubber 9 and the outer ply 20F. At a location almost equal to the radial height D of the apex location A, the strip 8 has a maximum thickness t. In the tire size shown the maximum thickness t is 0.3 inches (7.6 mm).

The rubber properties of the various bead components are selected to provide a cool running tire under high loads and pressures. When measured the modulus (M300) MPa, of the apex is in the ranges of 20 to 25, the rubber of the plies is in the range of 14 to 18, the strip 8 is in the range of 13 to 16 and the sidewall 9 is in the range of 5 to 8. The material (M300) modulus is based on a cure rate of 80 min@135° C. The above components have the following relationship in terms of modulus apex>ply≧strip>sidewall. In the illustrated embodiment the rubber properties of the sidewall 9 was 7.2 MPa, the apex was 20.2 MPa ,the inner plies 2A through 2D were 17.0 MPa, the outer plies 2E, 2F were 17.0 and 14.1 MPa, respectively, and the strip 8 was 14.1 MPa.

The resultant structure has the inner plies 2A through 2D and outer plies 2E and 2F closely spaced being separated in the area directly above the apex location A by a thickness of two ply layers extending a distance of over 1.0 inch (25.4 mm), preferably about 1.5 inches (37.6 mm) above the apex location A, which is further reduced to a space of one ply layer thickness or about 0.06 inches (1.5 mm) over a further radially outward distance of less than 1.0 inches (25.4 mm) and then the plies 2D and 2E are adjacent thereafter extending to the opposite bead 30. This creates a very narrow ply path closely approximately the theoretical optimum neutral or natural ply line. Those skilled in the art appreciate the neutral or natural ply line is the location wherein the shear stresses along the ply line are zero. The closer the plies are positioned along the neutral or natural path the less shear energy. When the tire is severely deflected the inner plies 2A through 2D move into tension, being above the neutral or natural ply path while the outer plies 2E and 2D almost adjacent the neutral or natural ply path were slightly compressed most of the compressive strain and shear energy is absorbed by the strip 8. The amount of compressive shear loading is greatly reduced when compared to the prior art tire. This means that the tire can be built with one more inner ply 2D yielding a higher strength tire capable of more load carrying capacity based on the approximately 3.0 inches (76 mm) of flipper length that can be eliminated.

The tire 100 in the example was a 50×20.0R22 tire size having a 32-ply rating, the reduction of the flipper length saved approximately 6 lb per tire. As one can readily appreciate weight saving are very important feature in aircraft tire design. The tire of the exemplary size was made for the Boeing 777 aircraft.

The tire of the present invention provides an unexpected and beneficial weight reduction by reducing the flipper size to the amount needed to prevent the plies 2A–2F, particularly 2D adjacent the bead from fretting and freying due to abrasion against the bead core 3.

The flipper 50 being located well below the apex location A means there is an opportunity to keep the inner plies and the outer plies much closer to the optimum natural ply path. The cords 51 of the flipper can be made equal to or smaller in diameter than the cords 21 of the plies. The cord 51 when made of a diameter of 0.56 mm has a strength of 840 denier/d, at 1.02 mm diameter the cord 51 has a strength of 1890 d/3, at 1.22 mm diameter the cord 51 has 1890 d/4. In each case the textile material was nylon 66.

The ply cords 21 were of the size 1.22 mm in terms of diameter.

Figure 5A:
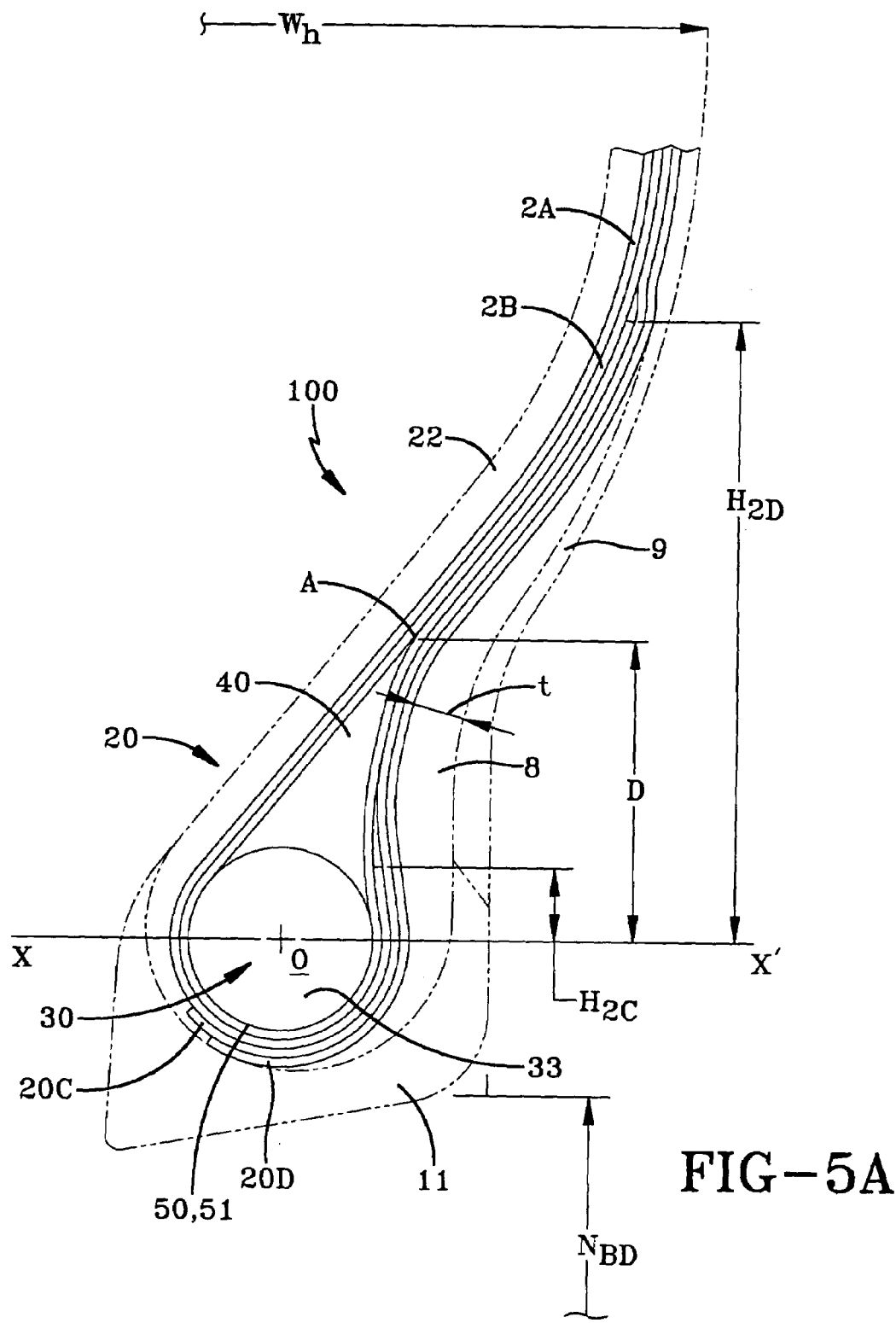
FIGS. 5A, 5B and 5C, and 5D are partial cross-sections showing the tire of the present invention.
Figure 5B:
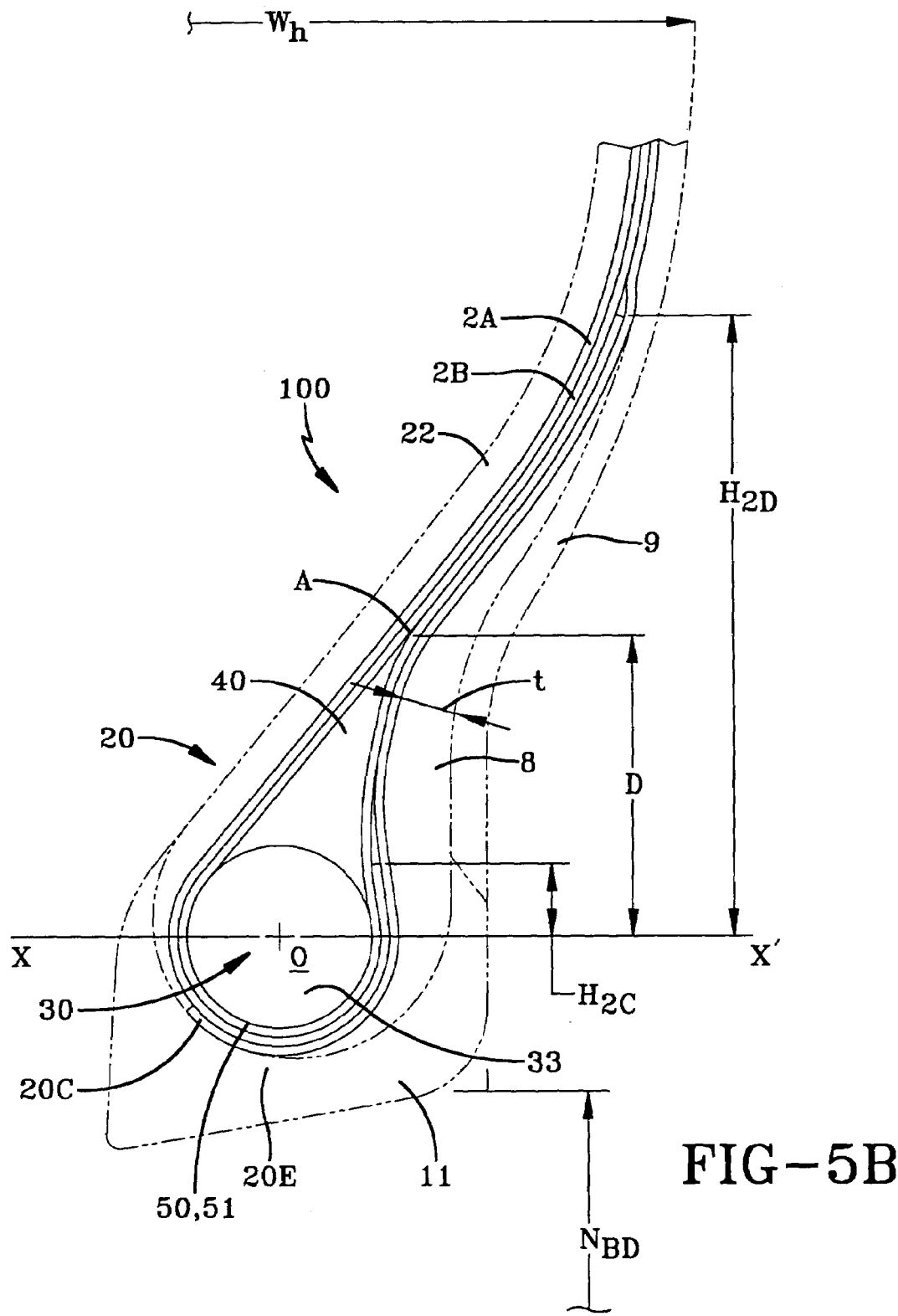
Figure 5C:
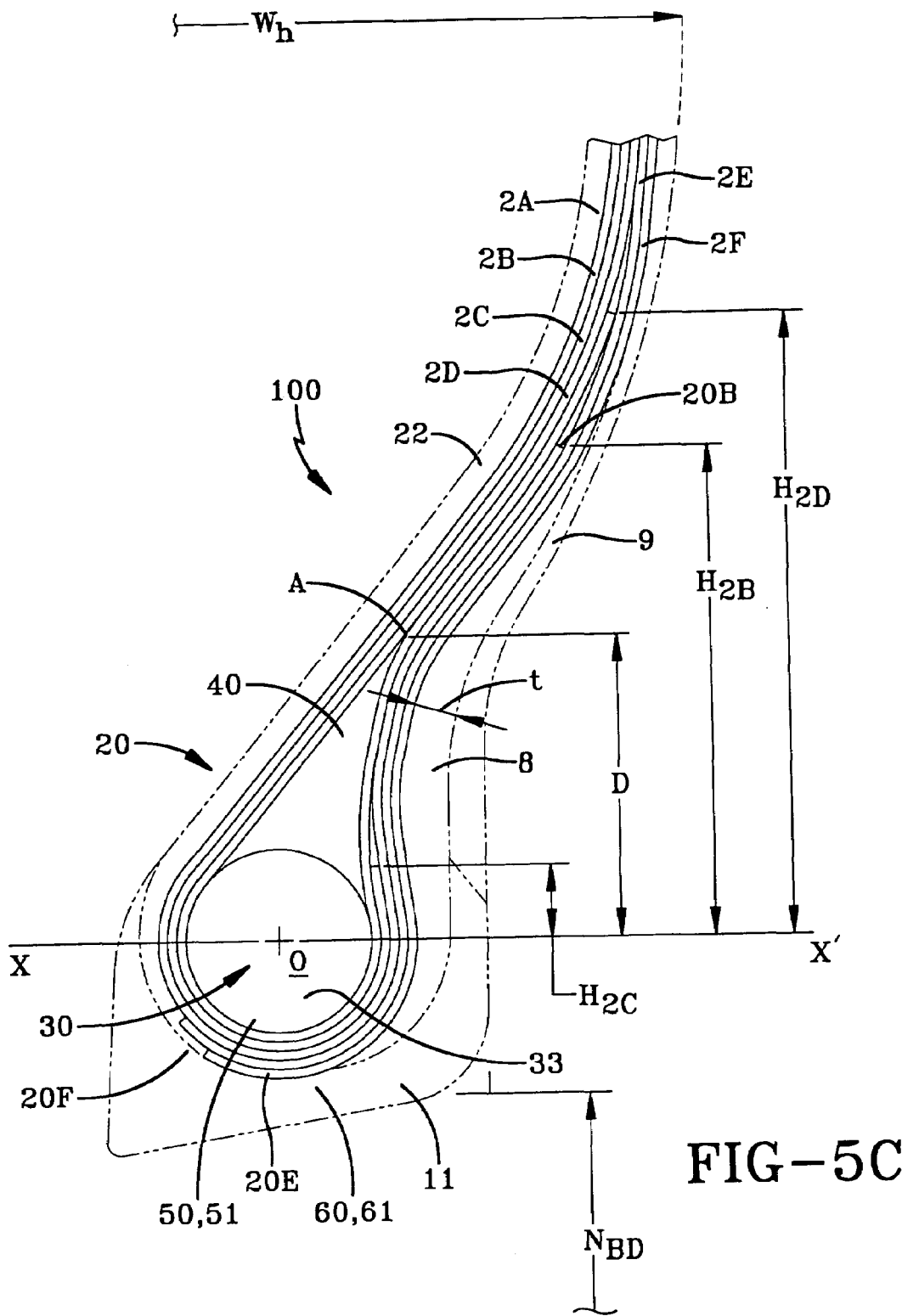
Figure 5D:
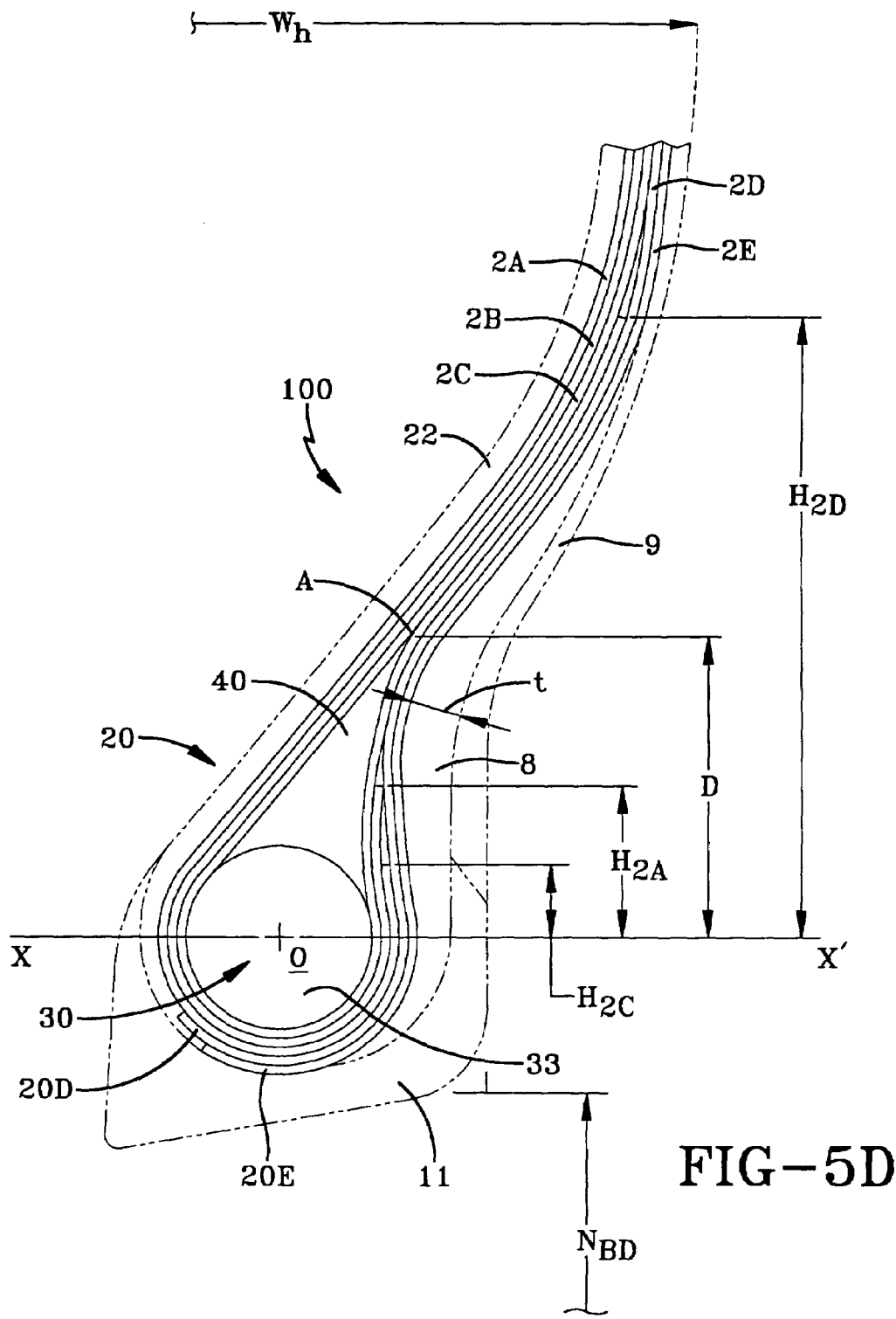

With reference to FIGS. 5A through 5D, various alternative constructions are illustrated. In FIG. 5A, the carcass employs two axially inner plies 2A, 2B and two axially outer plies 2C and 2D. In FIG. 5B, the carcass has two axially inner plies 2A, 2B and one axially outer ply 2C. In FIG. 5C, the carcass employees three axially inner plies 2A, 2B, and 2C, and two axially outer plies 2D and 2E. In FIG. 5D, the carcass has a three ply inner and two ply outer construction as in FIG. 5C, but with a variation in the end locations of the respective turnups. Other combinations such as four, five and six axially inner plies in combination with two axially outer plies, are feasible. The additional plies being employed to increase the load carrying capacity of the tires.

The rubber chafer 11, as shown in FIGS. 2 and 3, has a minimum gauge thickness Z in the range of 0.04 inches (1.0 mm) to 0.16 inches (4.1 mm). The minimum gauge thickness Z when less than 0.04 inches (1.0 mm) can cause the bead base to crack resulting in a slow loss of tire pressure. When the thickness Z exceeds 0.16 inches (4.1 mm) the bead and the plies can rock or rotate back and forth under load. This creates a large amount of movement of the bead under overload conditions. The distance Z is measured under the bead from the radially innermost cord 21 or 61 of a ply 2 or a chipper 60, if used.

The rubber chafer 11 has a radially inner first edge $R_I$ and a radially inner second edge $R_E$. Each edge $R_I$ and $R_E$ is radially located above a line P, P being parallel to the axis of rotation and tangent to the radially innermost location of the bead core 33. Each edge is also located a distance of 50% or less of the distance D as measured from line XX'. The benefits of this particular location of the first chafer edge $R_I$ is that the tire mounting and unmounting equipment is less prone to catch the edge at this location. The edge $R_I$ must be below 50% D because the tensile stresses above 50% D are excessively high and could cause a cracking of the radially inner edge $R_I$ under cyclic loading.

The second radially outer edge $R_E$ is ideally located above the line P to prevent the plys $20_E$ and $20_F$ from becoming loose in the heel region due to high compressive stresses and strains in this location under severe loads. The edge $R_E$ also must be located below 50% of the distance D to prevent the rubber between the outer plys $20_E$ and $20_F$ and the sidewall chafer interface from becoming too high in heat generation under severe overload conditions. This is particularly true due to the hardness of the chafer 11 relative to the sidewall rubber, it being understood that high shore hardness rubbers used in chafer can yield high heat build ups.

As can be easily appreciated, the tire of the present invention can result in a very high strength structure of great durability for its otherwise light weight.

What is claimed is:

1. A pneumatic tire for use on aircrafts having a nominal bead diameter $N_{BD}$, a tread, a crown reinforcement, and a radial carcass reinforcement comprising at least one axially inner ply of textile cord wound around a pair of bead cores, the bead cores have a radial height $B_h$, the at least one axially inner ply being wound around the bead core in each bead from inside to the outside forming outside turn-ups and at least one axially outer ply of textile cords extending from bead to bead along the turn-ups of the inner plies, each bead having an elastomeric filler of substantially triangular shape, the apex A of the filler being located above the bead core extending a distance D as measured from a line YY' parallel to the axis of the tire and through the location of the nominal bead diameter, and a flipper wound around the bead core to form an axially inner leg and an axially outer leg, the axially inner leg being located at a radial distance $L_i$ from the reference line YY', and the axially outer leg being located a radial distance $L_E$ from the reference line YY', wherein $L_i > B_H$ and LE<.7D;

the tire further including;
a plurality of rubber components including ply rubber, elastomeric filler rubber, an elastomeric strip rubber, and a sidewall rubber, wherein the rubber modulus (M300) of the apex is greater than or equal to the ply rubber modulus, and the ply rubber modulus is greater than or equal to the strip rubber modulus, and the strip rubber modulus is greater than the sidewall rubber modulus.

* * * * *